US 6,668,329 B1

(12) United States Patent
Rudd et al.

(10) Patent No.: US 6,668,329 B1
(45) Date of Patent: Dec. 23, 2003

(54) SYSTEM FOR ENABLING A RECEIVER FOR ONLY A FIX AMOUNT OF TIME AND DISABLING THE RECEIVER THEREAFTER

(75) Inventors: Michael L Rudd, Fort Collins, CO (US); Kevin N Smith, Fort Collins, CO (US); Steven D Hariri, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/392,424

(22) Filed: Sep. 9, 1999

(51) Int. Cl.[7] .................. G06F 1/32; G06F 15/16; H04L 7/00
(52) U.S. Cl. .................. 713/320; 713/401; 709/232
(58) Field of Search .................. 713/320, 401; 709/232; 370/311

(56) References Cited

U.S. PATENT DOCUMENTS

| 4,449,248 | A | | 5/1984 | Leslie et al. |
| 4,523,332 | A | | 6/1985 | Mori |
| 5,481,732 | A | * | 1/1996 | Shahbazi ............ 713/323 |
| 5,631,636 | A | | 5/1997 | Bane |
| 5,651,384 | A | | 7/1997 | Rudrich ............ 137/1 |
| D382,297 | S | * | 8/1997 | McGlashan et al. ....... 172/361 |
| 5,722,046 | A | | 2/1998 | Serfaty et al. |
| 5,923,443 | A | * | 7/1999 | Nykanen et al. ............ 358/442 |
| 5,929,771 | A | * | 7/1999 | Gaskill ................. 340/825.44 |
| 5,940,771 | A | * | 8/1999 | Gollnick et al. ............ 455/517 |
| 6,040,572 | A | * | 3/2000 | Khovaylo et al. .......... 250/235 |
| 6,144,840 | A | * | 11/2000 | Alton et al. ............... 455/38.3 |

FOREIGN PATENT DOCUMENTS

| GB | 2265232 A | | 9/1993 | ............. G06F/1/32 |
| JP | 09171422 A | * | 6/1997 | ............. G06F/1/32 |
| JP | 10-322777 | | 12/1998 | ............. H04Q/9/00 |
| WO | WO 99 29055 A | | 10/1999 | |

OTHER PUBLICATIONS

IBM, Group Encoding Method for Infrared Communication, Mar. 1, 1986, Vol 28, Issue 10, pp. 4440–4441.*

* cited by examiner

Primary Examiner—Thomas Lee
Assistant Examiner—Suresh K Suryawanshi

(57) ABSTRACT

Disclosed is a method for conserving power in a battery-powered electronic appliance having a communications interface including receive mode circuitry and a battery that supplies power to the receive mode circuitry when the receive mode circuitry is enabled. Upon power up of the appliance, the communications interface is initialized, and the receive mode circuitry is enabled to operate in a receive mode. A predetermined enable time is then timed. When the predetermined enable time expires, the receive mode circuitry is disabled.

22 Claims, 3 Drawing Sheets

SYSTEM FOR ENABLING A RECEIVER FOR ONLY A FIX AMOUNT OF TIME AND DISABLING THE RECEIVER THEREAFTER

FIELD OF THE INVENTION

The present invention pertains generally to electronic appliances, and more particularly to a method and apparatus for allowing appliances which communicate via infrared technology to automatically enter a receive mode when powered up.

BACKGROUND OF THE INVENTION

The increasing use of portable computing appliances means that a user may store and work on data files on a fixed desktop computer at his workstation on site, and take a personal computing appliance such as a portable or palm top computer with him for use off-site. Data is typically transferred between the desktop appliance and the personal computer-appliance via a cable or a close range infrared (IR) link. The wireless access provided by electronic appliances allows greater flexibility and convenience.

The built-in infrared communications ability of electronic appliances allows direct short distance communication. However, the current state of infrared communications between appliances remains problematic. First, prior art appliances require a user interface such as a dedicated button that allows the user to place the appliance in a receive mode in order to allow it to receive input from other appliances. Due to the increased market for greater portability and therefore smaller devices, it would be desirable to condense or eliminate the need for a user interface associated With placing the device in a receive mode in order to receive input from other devices. In addition, the method for placing the device into receive mode is often not intuitive and requires the user to refer to an instruction manual and commit the process to memory. It would be desirable to eliminate the need on the part of the user to manually place the appliance into receive mode. Second, if the receive mode user interface malfunctions in prior art devices, there is typically no way for the appliance, which may otherwise function normally, to receive input. This makes it inconvenient for users desiring non-critical input from other devices, and crucial for users: needing critical input from other devices. Furthermore, a malfunctioning receive mode user interface makes it difficult for technical support engineers to run diagnostics on the appliance when it is not working properly. Finally, prior art appliances typically need to be powered all the time in order to receive potential incoming communications from other appliances. To accomplish this, many devices provide a "sleep" mode which places the device in the lowest possible state of power consumption while still powering the receive circuitry. Nonetheless, the requirement of supplying continuous power in a portable battery powered appliance results in a high battery-replacement factor, which is not only expensive, but often can result in the appliance not functioning when a critical communication is received. Thus, it would be desirable to have an alternative method for conserving power in portable battery-powered appliances.

Accordingly, a need exists for an improved receive mode for appliances that communicate via an infrared port.

SUMMARY OF THE INVENTION

The present invention is a novel automatic receive mode for infrared devices. By automatically entering a receive mode when powered up, an appliance implemented in accordance with the invention no longer requires a user interface associated with placing the device in a receive mode, thereby reducing or eliminating user interface space and complexity. In addition, by eliminating any user interface associated with placing the appliance into a receive mode, the invention eliminates any user intervention required to place the device into receive mode, thereby simplifying the operation of the device by the user. Because appliances implemented in accordance with the invention automatically enter receive mode upon power up, this both eliminates any receive problems associated with malfunctioning of a user interface as in prior art appliances, and also allows technical support engineers to run diagnostics on the appliance when it is not working properly if the device is capable of receiving and processing diagnostic commands through this interface. Finally, the automatic receive mode upon power-up provides a simple method for conserving power in battery powered applications. The appliance simply remains off unless the user knows a communication is about to be received. When an appliance is ready to send a communication to another appliance, the other appliance is powered on, automatically enters receive mode for a predetermined period of time, receives the communication if one is received within the predetermined period of time, and then acts on the communication in accordance with the functional purpose of the particular appliance. Thus, the invention provides a simple method for conserving power in portable battery-powered appliances.

In accordance with the invention, a battery-powered electronic appliance comprises a communications interface including receive mode circuitry and a battery that supplies power to the receive mode circuitry when the receive mode circuitry is enabled. Upon power up, the communications interface is initialized, and the receive mode circuitry is enabled to operate in a receive mode for a predetermined amount of time. A timer times the predetermined amount of time. If the timer expires, the receive mode circuitry is disabled to remove power from the receive mode circuitry, thereby conserving battery power in the device. Preferably, if the predetermined enable time expires while the receive mode circuitry is currently receiving input, the predetermined enable time is extended by an extension time, and the timer is restarted, with this process repeating until the receive mode circuitry is no longer receiving input. In a preferred embodiment, the receive mode circuitry is re-enabled periodically after a predetermined disable time, and the timing process is repeated, causing the receive mode circuitry to be disabled again if data is not received within the predetermined enable time.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel method for implementing an automatic receive mode for infrared devices is described in detail hereinafter.

Although the invention is described in the context of the illustrative embodiments, which employ preferred components such as infrared (IR) communication links as the communication transfer technology, it will be appreciated by those skilled in the art that the principles of the invention extend to any electronic device that communicates with other electronic devices via a communication link that requires power to enable its receive mode.

Figure 1:
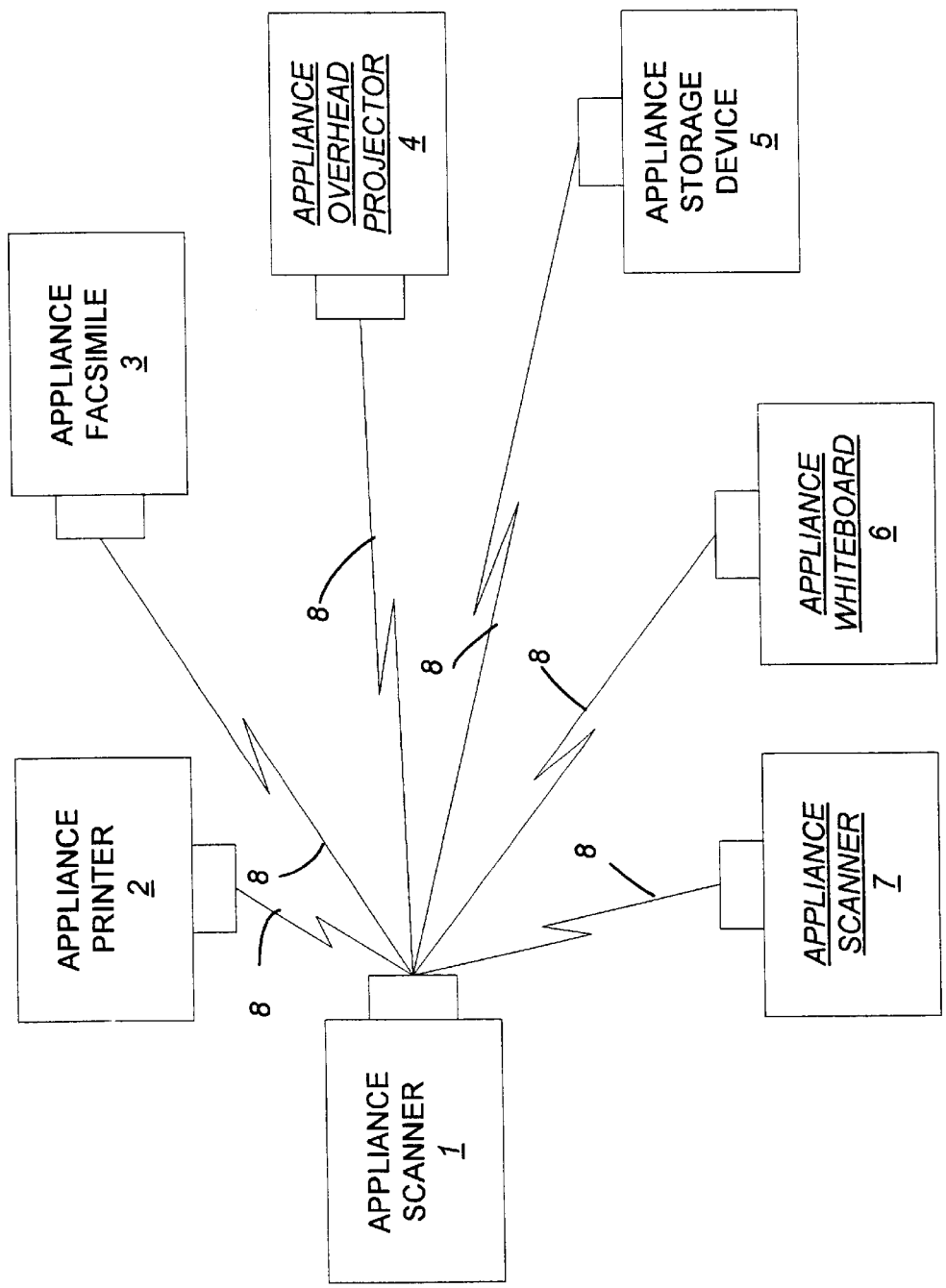
FIG. 1 is a high level block diagram of a communication system illustrating appliance communication.

In the environment contemplated for use of the invention, appliances are capable of communicating directly with one another, as illustrated in FIG. 1. Thus, for example, an appliance scanner 1 is capable of communicating directly with one or more of appliance printer 2, appliance facsimile machine 3, appliance overhead projector 4, appliance storage device 5 (e.g., a document briefcase), appliance whiteboard 6, and/or to another appliance scanner 7. Communication links 8 are established between the communicating appliances by way of an automatic receive mode implemented in accordance with the invention.

Figure 2:
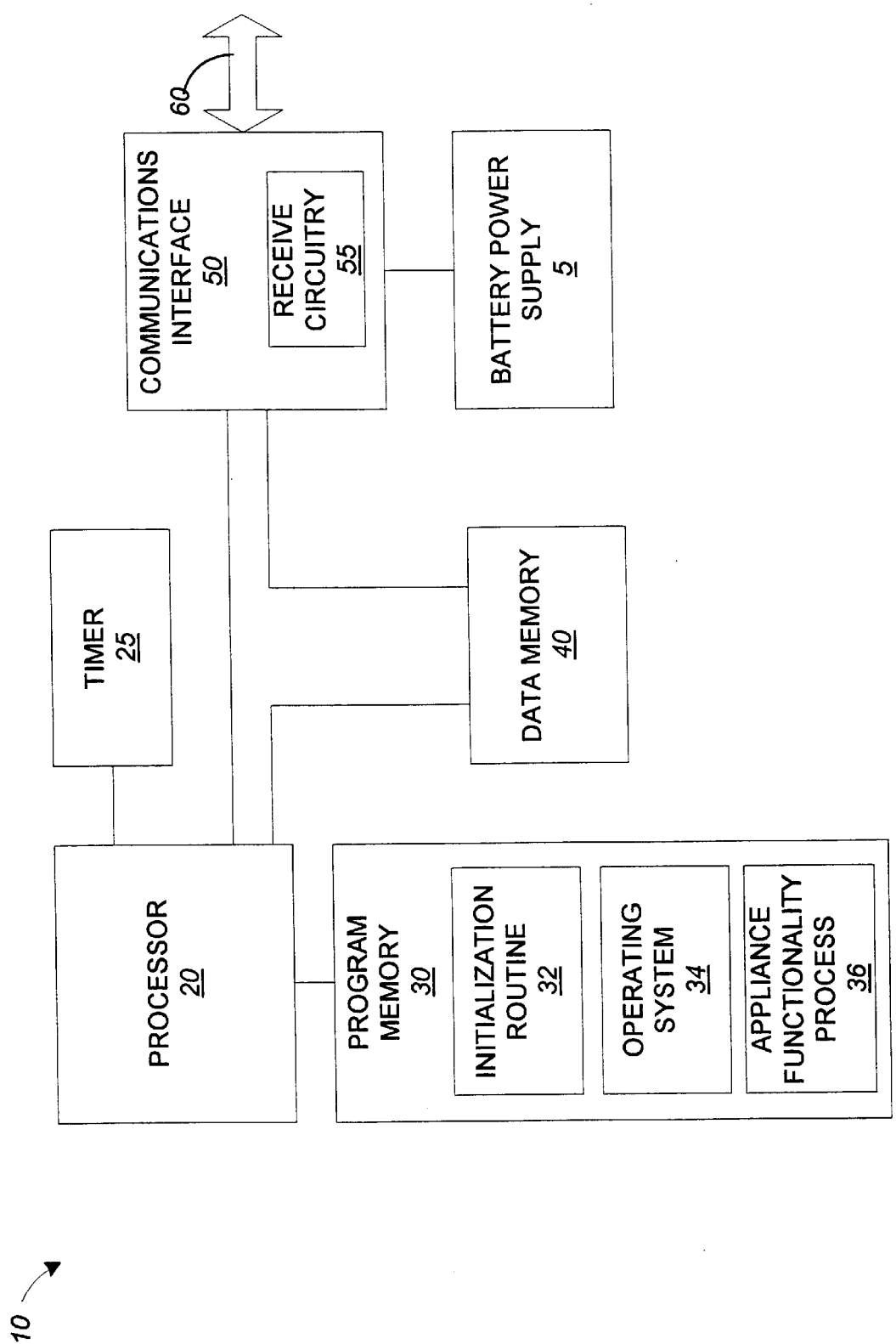
FIG. 2 is a block diagram of an appliance implemented in accordance with the invention.

Turning now to FIG. 2, there is illustrated a functional block diagram of an appliance 10 implemented in accordance with the invention. Appliance 10 comprises a processor 20, program memory 30, data memory 40, and a communication interface 50. Program memory 30 stores initialization routine 32 which is executed by processor 20 upon power up of the appliance 10. Initialization routine 32 performs a self-test of the appliance 10 and performs any necessary initialization of memory, interfaces, and appliance components. In accordance with the invention, initialization routine 32 initializes the communication interface 50 and then enables its receive mode, which remains enabled for a predetermined amount of time. To enable receive mode, the receive portion 55 of the communications interface 50 must be powered, in the preferred embodiment by a battery power supply 5. Battery 5 generally supplies all power to the appliance 10; however, battery 5 is shown in FIG. 2 as powering only the receive circuitry 55 for ease of illustration.

Once initialization is complete, initialization routine 32 starts up and passes control of the appliance 10 to an operating system 34, which resides in program memory 30 and is executed by processor 20.

As just described, during initialization communication interface 50 is initialized to allow appliance 10 to send and/or receive communications from other appliances. When initialized to receive communications, the receive mode of the appliance 10 is enabled immediately after the communications interface is initialized and for a predetermined period thereafter, as monitored by a timer 25, with optional time extensions. After the predetermined period with optional time extensions has expired, the receive mode of communications interface 50 is disabled in order to conserve power in the appliance 10. This is typically acceptable to the user since the main function of the appliance is not typically to receive information via the IR port, but rather to send information via the IR port. For example, if appliance 10 is an appliance printer, it may normally receive data to be printed via a dedicated parallel print port connected directly to a computer. The IR port in such a device is typically used to send the printed information to another appliance such as an appliance whiteboard, a document briefcase, or an appliance fax machine. However, it may also provide functionality to receive input via IR communications interface 50 to allow other appliances such as a palmtop computer to send data to the appliance printer to be printed without requiring a direct-wire connection between the palmtop and appliance printer.

In the illustrative embodiment, communication interface 50 establishes communication with other remote appliances over an infrared (IR) communication link 60. However, it will be appreciated by those skilled in the art that the particular technology of the communication link may be any type, including via an analog or digital modem, short-wave radio, an internet link, etc., over which two or more remote appliances can communicate.

When incoming data is received, processor 10 interprets the received appliance signals over communication link 60 and executes appliance functionality process 36 which processes the signals according to the function of the particular appliance 10. For example, if the appliance 10 is an appliance printer, appliance functionality process 36 processes the data to be printed and causes it to be printed.

Figure 3:
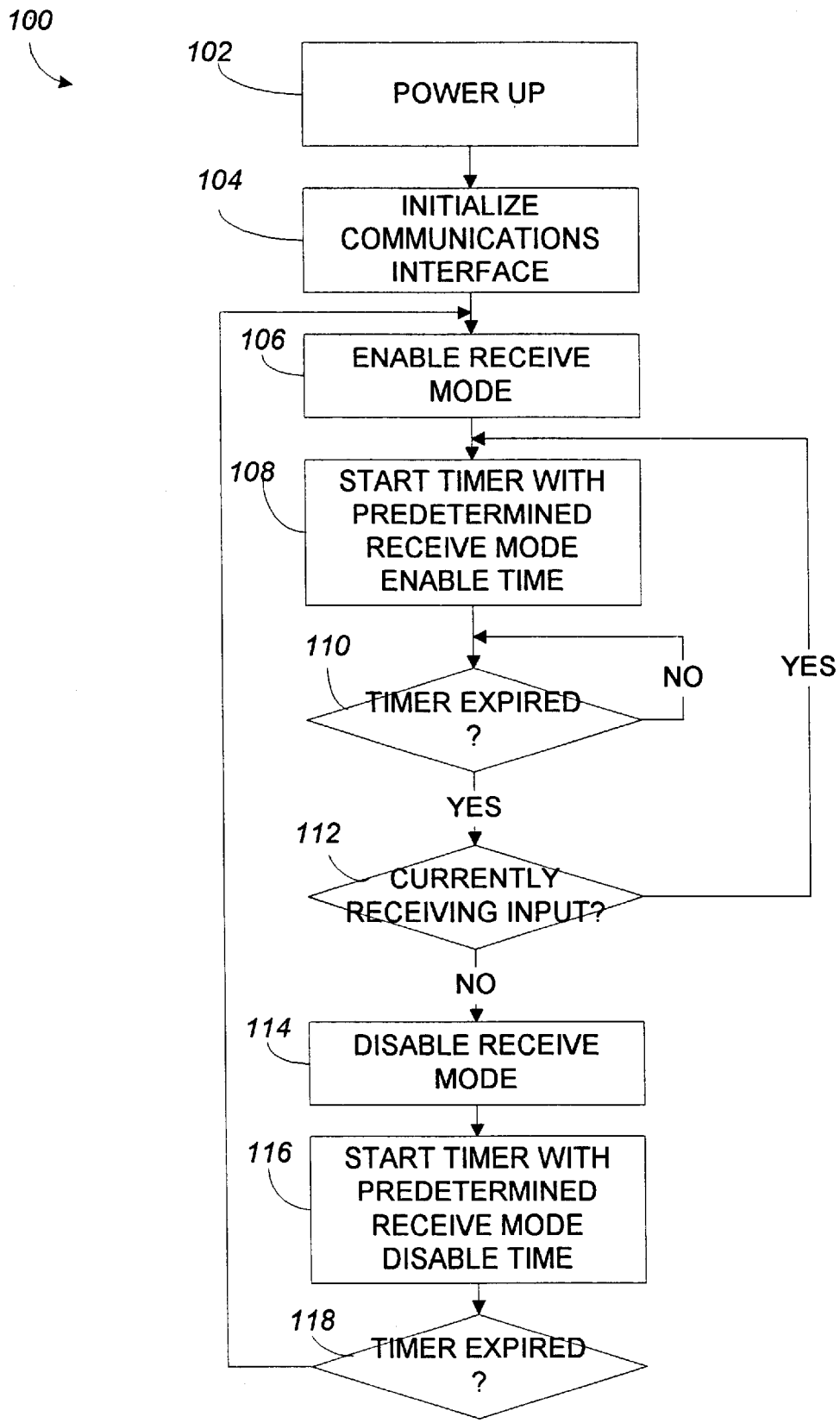
FIG. 3 is an operational flowchart illustrating the method of the invention.

FIG. 3 is an operational flowchart of a method 100 implemented in accordance with the invention. Method 100 begins upon power up 102 of appliance 10. According to this method 100, upon power up 102 of appliance 10, the communications interface 50 is initialized 104 by the initialization routine 32. Initialization routine 32 then enables 106 the receive mode of the communications interface 50. A timer 25 initialized with a predetermined time period is started 108. When the timer 25 expires 110 and communications interface 50 is not currently receiving data, as determined in step 112, the receive mode of communications interface 50 is disabled 114 in order to conserve appliance power. If the timer 25 expires 110 and communications interface 50 is currently receiving data, as determined in step 112, the timer 25 is reset to a predetermined extension period of time, and steps 108 through 116 are repeated until a condition in which the timer 25 expires, as determined in step 110 and in which the appliance is not currently receiving data, as determined in step 112, exist.

In an alternative embodiment of the invention, the appliance is placed in receive mode for a predetermined portion of a predetermined interval of time. For example, the appliance may be set in receive mode for the first 12 seconds of every minute, thereby conserving power by powering the receive mode circuitry only 12 sec/60 sec=20% of the time. FIG. 3 illustrates the method of this embodiment with additional steps 116 and 118. In this method, after the receive mode is turned off in step 114, a timer 25 is initialized with a predetermined interval of time during which the receive mode is to be disabled and started 116. When the timer 25 expires 118, the receive mode of communications interface 50 is enabled 106, and the method continues through steps 106 to 118 as described above. Those skilled in the art will appreciate that the timer used to monitor the enabled portion versus the disabled portion of the predetermined receive mode period may be the same implemented with a single timer or with multiple timers, depending on the complexity of the algorithm. In addition, the predetermined amount of time in step 108 may be different (e.g., a smaller amount) than the predetermined amount of time that the timer is initialized to during the first pass of the method 100.

The above described invention provides several advantages over the prior art. By causing an appliance to automatically enter receive mode for a predetermined amount of time upon power up of the device, the additional cost and unnecessary complexity from both the manufacturer's standpoint and the user's standpoint is eliminated. Additionally, with an automatic receive mode, the appliance is no longer susceptible to malfunctions of the receive mode user interface, thereby increasing the ability for technical support engineers to utilize the IR communications interface of the appliance to run diagnostics to debug any problems that may exist in any other portion of the appliance. Finally, the invention provides a method for conserving power in battery powered appliances.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A method for conserving power in a battery-powered, functionally discrete, computer peripheral, said computer peripheral comprising a communications interface comprising receive mode circuitry and a battery that supplies power to said receive mode circuitry when said receive mode circuitry is enabled, said method comprising the steps of:

upon power up of said functionally discrete, computer peripheral, initializing said communications interface and enabling said receive mode circuitry to operate in a receive mode for direct communication with other devices;

timing a predetermined enable time; and disabling said receive mode circuitry when said predetermined enable time expires.

2. A method in accordance with claim 1, wherein:

said enabling step comprises supplying said battery power to said receive mode circuitry.

3. A method in accordance with claim 2, wherein:

said disabling step comprises not supplying said battery power to said receive mode circuitry.

4. A method in accordance with claim 1, wherein:

if said predetermined enable time expires and said receive mode circuitry is currently receiving input, timing a predetermined enable extension time; and when said predetermined enable extension time expires, repeating said timing a predetermined enable extension time until said receive mode circuitry is no longer receiving input.

5. A method in accordance with claim 1, comprising:

after said disabling step, timing a predetermined disable time; and repeating said enabling step through said repeating step.

6. A method in accordance with claim 5, wherein:

if said predetermined enable time expires and said receive mode circuitry is currently receiving input, timing a predetermined enable extension time; and when said predetermined enable extension time expires, repeating said timing a predetermined enable extension time until said receive mode circuitry is no longer receiving input.

7. A functionally discrete computer peripheral that is powered by a battery, comprising:

a communications interface comprising receive mode circuitry that allows said functionally discrete computer peripheral to receive input, said receive mode circuitry receiving power from said battery when said receive mode circuitry is enabled;

a program memory;

an automatic receive mode process, stored in said program memory, which upon power up of said computer peripheral, i) enables said receive mode circuitry to operate in said receive mode for direct communication with other devices, ii) times a predetermined receive mode enable time, and iii) disables said receive mode circuitry when said predetermined receive mode enable time expires; and a processor which executes said automatic receive mode process.

8. A functionally discrete computer peripheral in accordance with claim 7, comprising:

a timer which times said receive mode enable time and alerts said processor when said receive mode enable time expires.

9. A computer readable storage medium tangibly embodying program instructions for conserving power in a battery-powered, functionally discrete, computer peripheral, said computer peripheral comprising a communications interface comprising receive mode circuitry and a battery that supplies power to said receive mode circuitry when said receive mode circuitry is enabled, said program instructions comprising instructions for:

upon power up of said functionally discrete computer peripheral, initializing said communications interface and enabling said receive mode circuitry to operate in a receive mode for direct communication with other devices;

timing a predetermined enable time;

disabling said receive mode circuitry when said predetermined enable time expires.

10. A computer readable storage medium in accordance with claim 9, wherein:

said program instructions for enabling said receive mode circuitry comprise instructions for supplying said battery power to said receive mode circuitry.

11. A computer readable storage medium in accordance with claim 10, wherein:

said program instructions for disabling said receive mode circuitry comprise instructions for not supplying said battery power to said receive mode circuitry.

12. A computer readable storage medium in accordance with claim 9, further comprising program instructions for:

if said predetermined enable time expires and said receive mode circuitry is currently receiving input, timing a predetermined enable extension time; and when said predetermined enable extension time expires, repeating said timing a predetermined enable extension time until said receive mode circuitry is no longer receiving input.

13. A computer readable storage medium in accordance with claim 9, further comprising program instructions for:

after said disabling step, timing a predetermined disable time; and repeating said enabling step through said repeating step.

14. A computer readable storage medium in accordance with claim 13, further comprising program instructions for:

if said predetermined enable time expires and said receive mode circuitry is currently receiving input, timing a predetermined enable extension time; and when said predetermined enable extension time expires, repeating said timing a predetermined enable extension time until said receive mode circuitry is no longer receiving input.

15. A method in accordance with claim 1, wherein said computer peripheral is selected from a group consisting of: a printer, a scanner, a whiteboard, an overhead projector, and a facsimile machine.

16. A method in accordance with claim 1, wherein said communications interface is an IR interface.

17. A computer peripheral in accordance with claim 7, wherein said computer peripheral is selected from a group consisting of: a printer, a scanner, a whiteboard, an overhead projector, and a facsimile machine.

18. A computer peripheral in accordance with claim 7, wherein said communications interface is an IR interface.

19. A computer readable storage medium in accordance with claim 9, wherein said computer peripheral is selected from a group consisting of: a printer, a scanner, a whiteboard, an overhead projector, and a facsimile machine.

20. A computer readable storage medium in accordance with claim 9, wherein said communications interface is an IR interface.

21. A system, comprising:
- at least two functionally discrete computer peripherals, powered by batteries, each comprising:
  - an infrared communications interface comprising receive mode circuitry that allows said computer peripheral to receive input directly from another of the computer peripherals, said receive mode circuitry receiving power from said battery when said receive mode circuitry is enabled;
  - a program memory;
  - an automatic receive mode process, stored in said program memory, which upon power up of said computer peripheral, i) enables said receive mode circuitry to operate in said receive mode for direct communication with other devices, ii) times a predetermined receive mode enable time, and iii) disables said receive mode circuitry when said predetermined receive mode enable time expires; and
  - a processor which executes said automatic receive mode process.

22. The system of claim 21, wherein said computer peripherals are selected from a group consisting of: a printer, a scanner, a whiteboard, an overhead projector, and a facsimile machine.

* * * * *